W. O. WATSON.
ROLL-BOXES FOR COTTON-GINS.
No. 193,580. Patented July 24, 1877.
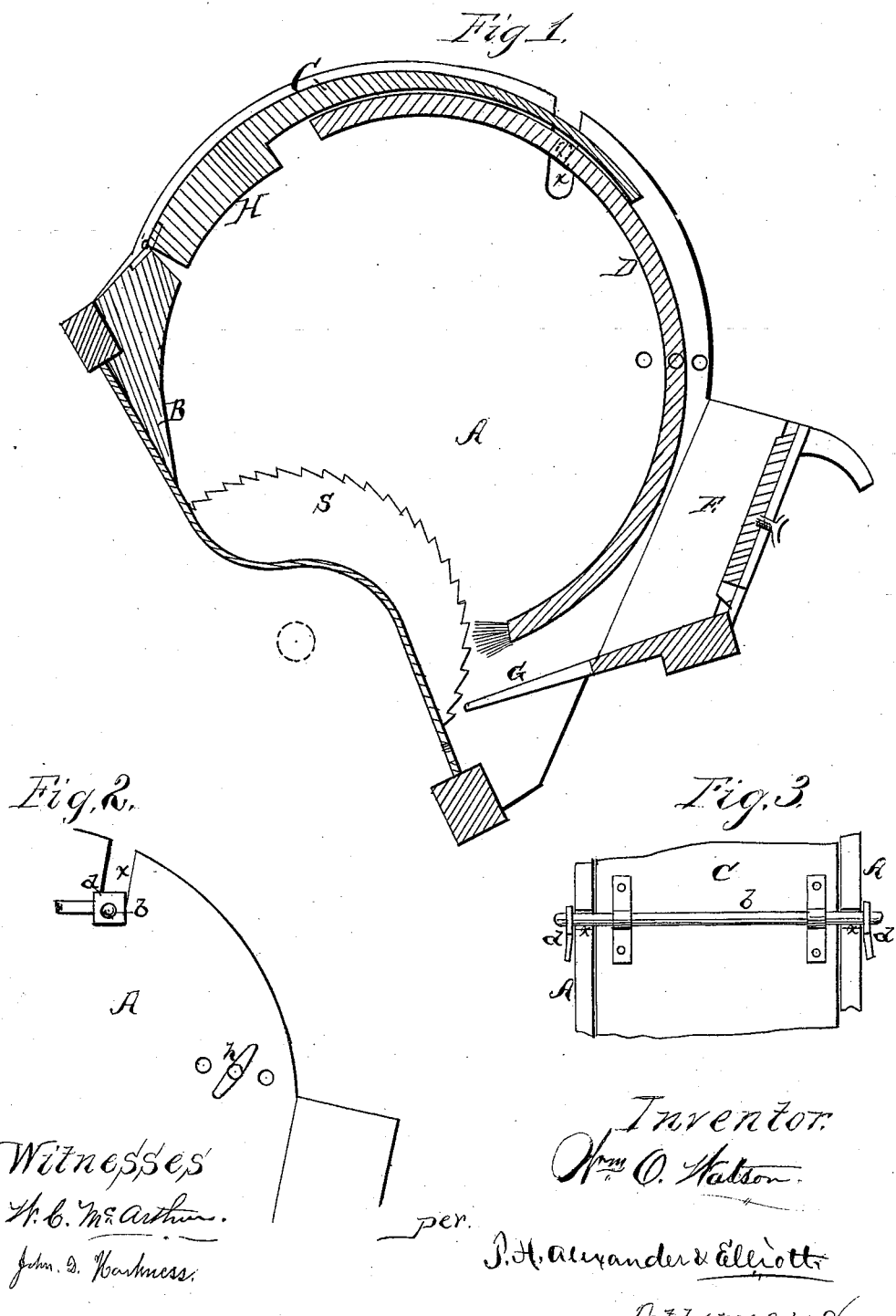

UNITED STATES PATENT OFFICE.

WILLIAM O. WATSON, OF ALBANY, GEORGIA.

IMPROVEMENT IN ROLL-BOXES FOR COTTON-GINS.

Specification forming part of Letters Patent No. 193,580, dated July 24, 1877; application filed May 18, 1877.

*To all whom it may concern:*

Be it known that I, WILLIAM O. WATSON, of Albany, in the county of Dougherty and State of Georgia, have invented certain new and useful Improvements in Roll-Boxes for Cotton-Gins; and I do hereby declare that the following is a full, clear, and exact description thereof, reference being had to the accompanying drawings, and to the letters of reference marked thereon, which form part of this specification.

My invention relates to roll-boxes for cotton-gins; and consists in the construction of a combination roll-box, by which the gin may be fed at the bottom or top, and the different parts properly adjusted, as will be hereinafter more fully set forth.

In order to enable others skilled in the art to which my invention appertains to make and use the same, I will now proceed to describe its construction and operation, referring to the annexed drawings, in which—

Figure 1 is a central vertical section, and Figs. 2 and 3 are details, of my invention.

A A are the side pieces of the roll-box; B, the condenser; C, the adjustable lid; D, the adjustable front; E, the feed-hopper; G, the ribs and S the gin-saws.

The condenser B is permanently secured to the side pieces A A, and the lid C hinged to the front edge of the condenser. This lid is provided with a rod, $b$, the ends of which pass down into slots $x\ x$ in the side pieces A A, and have thumb-nuts $d\ d$ screwed on their ends, to hold the lid at any point desired.

The front D is pivoted at its lower end, and adjusted and held at any angle by means of set-screws $h\ h$, passing through holes in the side pieces A into said front D.

By these adjustments it enables the operator to change the roll-box from an under feed to an upper feed by merely turning back the lid C; or, if desired, it can be very easily taken off. This sometimes is necessary, because planters sometimes gin over motes by mixing seed with them, and this cannot be well done by feeding at the bottom, because the seed will all fall out before they get into the roll-box.

But the most important advantage gained by this adjustment is in adjusting the roll-box to damp or dry cotton without having to raise or lower the ribs at the bottom, as is usually done to clean the seed.

By this adjustment the operator can regulate the escape or discharge of seed from the roll-box with perfect precision, and the gin-saws can run any desired depth in the roll, and yet be made to clean the seed the old way.

On the lid C, at the hinged end, on the under or inner side, is a flange, H, which performs a very important function in the adjustment of the lid C with relation to the condenser.

It will be noticed that when the adjustable front D is moved inward as far as it will go, and the lid C is let down to its lowest adjustment, the size of the roll is very much reduced, and the flange H on the lid C presses the roll downward so much that it causes the seed to escape from the roll very rapidly. Now, if the cotton to be ginned is damp, or the seed not sufficiently cleaned, the nuts $d$ on the rod $b$ are loosened and the lid gradually raised; and if the seed are not cleaned when the lid is raised to the top of the slots $x$, tighten the thumb-nuts $d$ there, and move out the thumb-screws $h$ from the inner holes to the next, and so on until the seed are cleaned.

The rod $b$ and slots $x$ may be dispensed with and thumb-screws used, as in the other adjustment, and this will be preferable in putting my invention onto old gins, as the side pieces may be used by simply drilling holes where the slots $x$ are.

Having thus fully described my invention, what I claim as new, and desire to secure by Letters Patent, is—

1. The front D, pivoted at its lower end, and adjustable out and in at the top, substantially as and for the purposes herein set forth.

2. The combination of the adjustable lid C and the adjustable front D, substantially as and for the purposes herein set forth.

3. The combination, in a roll-box for cotton-gins, of the condenser B, the adjustable lid C, with flange H, and the adjustable front D, all constructed and arranged to operate substantially as herein set forth.

In testimony that I claim the foregoing as my own I affix my signature in presence of two witnesses.

WILLIAM O. WATSON.

Witnesses:
 D. C. HIGHTOWER,
 W. H. SMITH.